United States Patent
Prociw et al.

(10) Patent No.: US 7,481,248 B2
(45) Date of Patent: Jan. 27, 2009

(54) FLEXIBLE HEAT SHIELDS AND METHOD

(75) Inventors: Lev Alexander Prociw, Elmira (CA); Harris Shafique, Longueuil (CA); Alexsandar Kojovic, Oakville (CA)

(73) Assignee: Pratt & Whitney Canada Corp., Longueil, Québec (CA)

( * ) Notice: Subject to any disclaimer, the term of this patent is extended or adjusted under 35 U.S.C. 154(b) by 665 days.

(21) Appl. No.: 10/940,692

(22) Filed: Sep. 15, 2004

(65) Prior Publication Data

US 2006/0054233 A1 Mar. 16, 2006

(51) Int. Cl.
*F16L 11/00* (2006.01)

(52) U.S. Cl. .................. 138/110; 138/123; 138/142; 138/149; 239/103; 239/127.1

(58) Field of Classification Search .............. 138/110, 138/123, 142, 149; 239/103, 139, 127.1
See application file for complete search history.

(56) References Cited

U.S. PATENT DOCUMENTS

| | | | |
|---|---|---|---|
| 2,514,170 A | 7/1950 | Walter et al. | |
| 3,131,535 A * | 5/1964 | Hensley | 239/127.1 |
| 3,289,943 A * | 12/1966 | Thomas et al. | 239/127.1 |
| 3,662,959 A * | 5/1972 | Sample, Jr. | 239/533.2 |
| 3,697,347 A * | 10/1972 | Lehman | 156/181 |
| 4,442,585 A | 4/1984 | McGehee, Sr. et al. | |
| 4,639,388 A | 1/1987 | Ainsworth et al. | |
| 4,836,080 A | 6/1989 | Kite, III et al. | |
| 4,854,416 A * | 8/1989 | Lalikos et al. | 181/207 |
| 5,183,079 A | 2/1993 | Blin | |
| 5,332,239 A * | 7/1994 | Steinetz et al. | 277/345 |
| 5,617,900 A | 4/1997 | Weil | |
| 5,654,060 A | 8/1997 | Holman et al. | |
| 5,744,252 A | 4/1998 | Rasky et al. | |
| 5,803,128 A * | 9/1998 | Reed | 138/123 |
| 5,974,784 A | 11/1999 | Feldman | |
| 6,045,884 A * | 4/2000 | Hess et al. | 428/36.1 |
| 6,062,266 A * | 5/2000 | Burkhardt | 138/114 |
| 6,151,898 A | 11/2000 | Hogan | |
| 6,230,748 B1 * | 5/2001 | Krawietz et al. | 138/121 |
| 6,251,498 B1 | 6/2001 | Fukushima et al. | |
| 6,340,510 B2 | 1/2002 | Hess et al. | |
| 6,446,675 B1 | 9/2002 | Goering | |
| 6,555,211 B2 | 4/2003 | Moody | |
| 6,607,010 B1 * | 8/2003 | Kashy | 138/121 |
| 2004/0237530 A1 * | 12/2004 | Brown | 60/740 |
| 2005/0126651 A1 * | 6/2005 | Sherwin | 138/127 |
| 2006/0144614 A1 * | 7/2006 | Kircanski et al. | 174/117 M |

* cited by examiner

*Primary Examiner*—James F Hook
(74) *Attorney, Agent, or Firm*—Ogilvy Renault LLP

(57) ABSTRACT

A heat shield comprises a flexible inner jacket configured and disposed to be fitted around at least a portion of a component, and a flexible outer jacket configured and disposed to be fitted around the inner jacket.

16 Claims, 5 Drawing Sheets

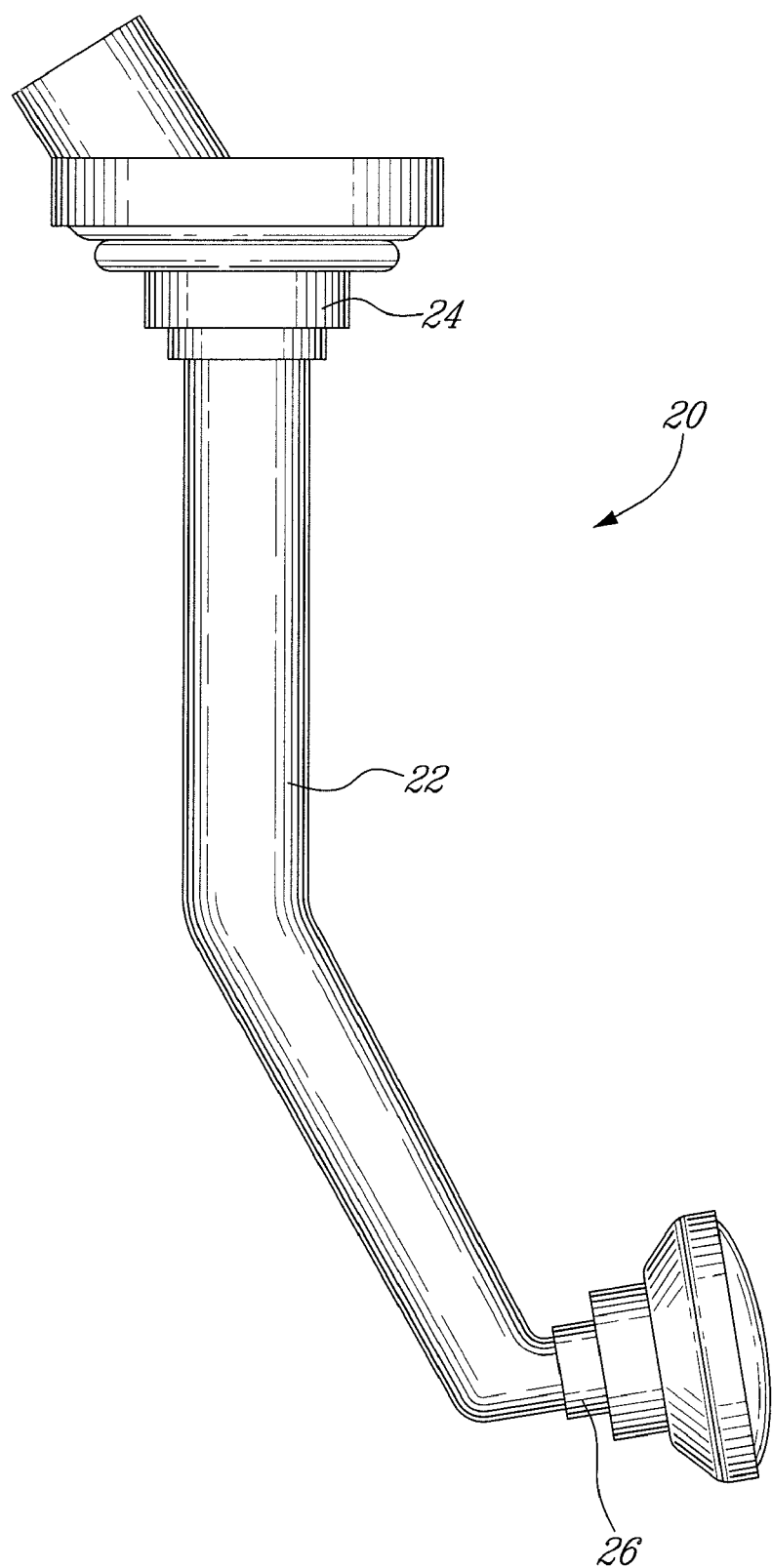
FIG_2

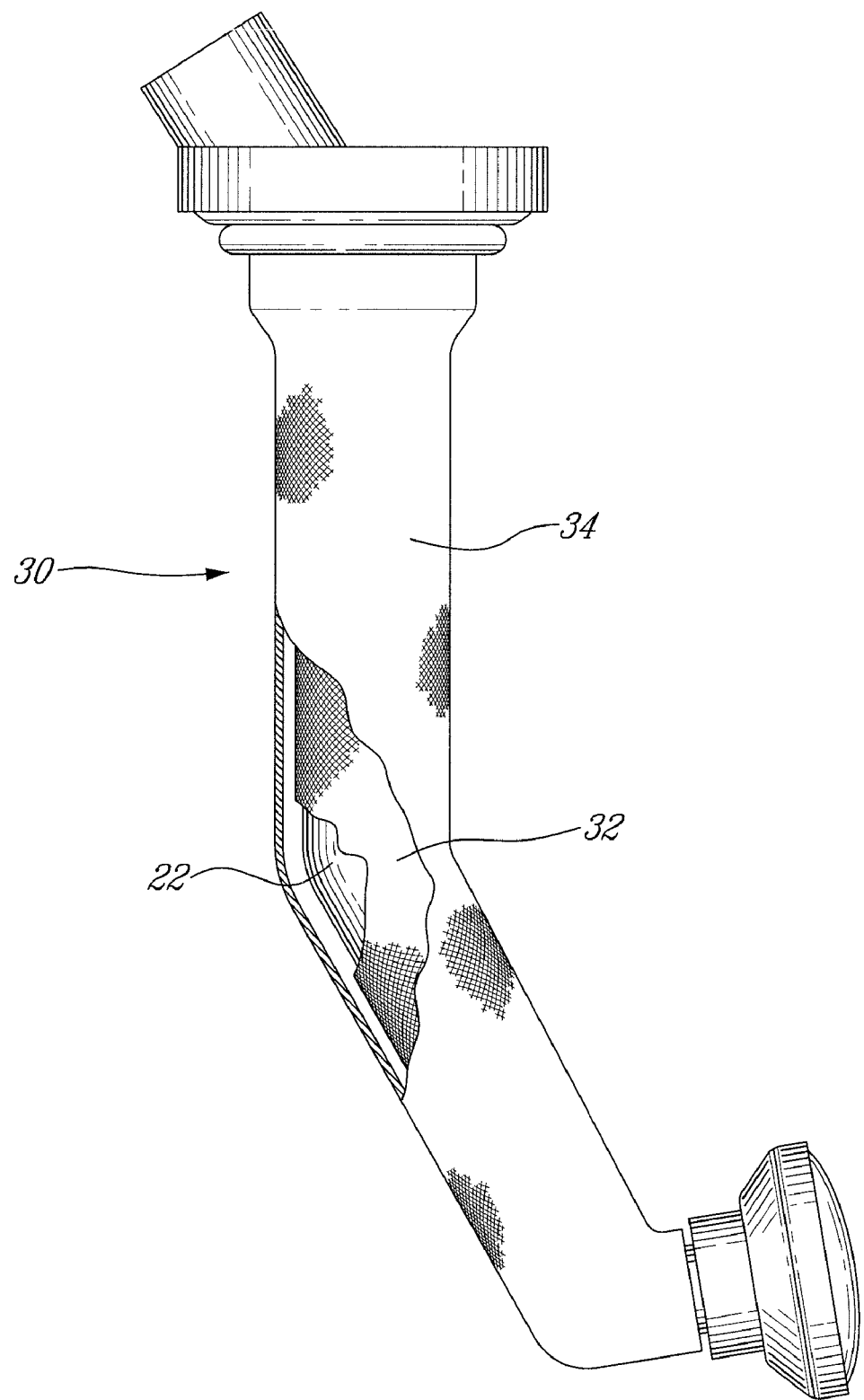

FLEXIBLE HEAT SHIELDS AND METHOD

TECHNICAL FIELD

The invention relates generally to heat shields and, more particularly, to an improved flexible heat shield well adapted for use in gas turbine engines and to a method of providing a heat shield on a component.

BACKGROUND OF THE ART

To mitigate the overheating of fuel nozzles in gas turbine engines and similar components subjected to intense heat, a heat shield is typically installed so as to provide thermal insulation and keep the component from overheating.

Many challenges face engineers in the design of heat shields. For instance, some of the components on which heat shields must be installed may have a non-linear geometry. Hence, the installation of a heat shield on such component is complex and costly. Another challenge is the fact that some components, for instance components in gas turbine engines, are under intense vibrations during operation. These vibrations can force a heat shield out of a component or out of its optimum position.

Accordingly, there is a need to provide an improved heat shield and an improved method of installing a heat shield on a component.

SUMMARY OF THE INVENTION

In one aspect, the present invention provides a heat shield for a component, the heat shield comprising:

a flexible inner jacket configured and disposed to be fitted around at least a portion of the component, the inner jacket comprising at least one layer of meshed thermal insulation material; and a flexible outer jacket configured and disposed to be fitted around the inner jacket, the outer jacket comprising at least one layer of meshed wires intersected by braze wires.

In another aspect, the present invention provides a heat shield for a component, the component having at least one portion to be covered by the heat shield, the heat shield comprising:

a flexible thermal insulation inner jacket covering the portion of the component; and an outer jacket covering the inner jacket between two opposite ends of the heat shield, the outer jacket comprising meshed wires wherein at least some junctions between wires of the meshed wires are attached by attachment points made from braze wires.

In another aspect, the present invention provides a method of installing a heat shield on a component, the method comprising:

providing a flexible inner thermal-insulation jacket and a flexible outer jacket between two ends of the component, the outer jacket being made of meshed wires and further comprising a plurality of braze wires intersecting the meshed wires;

securing ends of the outer jacket over the ends of the component;

heating the braze wires to melt it and form attachment points; and then cooling the attachment points until they solidify.

Further details of these and other aspects of the present invention will be apparent from the detailed description and figures included below.

DESCRIPTION OF THE DRAWINGS

Reference is now made to the accompanying figures depicting aspects of the present invention, in which:

FIG. 2 is a schematic side view of a fuel nozzle without a heat shield;

FIG. 3 is perspective and partially cut-away view showing the fuel nozzle of FIG. 2 being provided with a heat shield in accordance with a preferred embodiment of the present invention;

DETAILED DESCRIPTION

Figure 1:
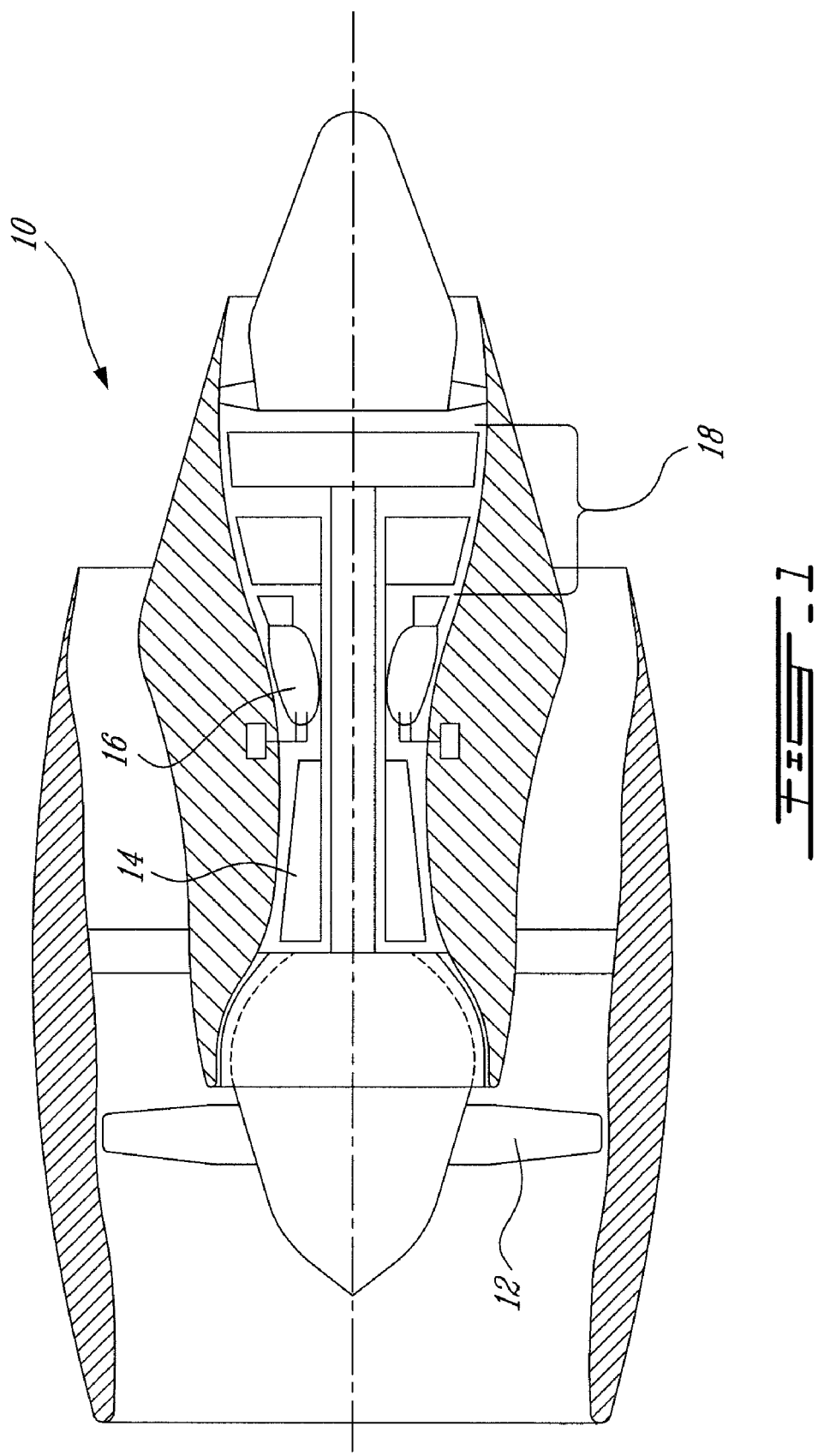
FIG. 1 shows a generic gas turbine engine to illustrate an example of a general environment in which the invention can be used.

FIG. 1 illustrates an example of a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. This figure illustrates an example of the environment in which the present invention can be used.

FIG. 2 shows a fuel nozzle 20 without a heat shield. This fuel nozzle 20 is an example of a component having a portion with a non-linear geometry on which can be provided the flexible heat shield in accordance with the present invention. The fuel nozzle 20 is located adjacent to the combustor 16 of the gas turbine engine 10. It comprises a stem 22 that requires the presence of a heat shield. This stem 22 has many angles with irregular sections. In this case, a heat shield 30 is provided between two opposite ends of the stem 22 that are, in this case, in the form of collars 24, 26. These collars 24, 26 are preferably used as connecting points for the heat shield.

FIG. 3 shows a heat shield 30, in accordance with a preferred embodiment of the present invention, as installed on the stem 22 of the fuel nozzle 20 shown in FIG. 2. In this case, almost the entire stem 22 is cover by the heat shield 30.

The heat shield 30 comprises a flexible inner jacket 32 configured and disposed to be fitted around the stem 22. This inner jacket 32 comprises at least one layer of meshed thermal insulation material, preferably a layer of woven ceramic fibres. Entrapped air inside the ceramic fibres contributes in the increase of the thermal insulation of the material. Adding many layers would increase the thermal insulation of the heat shield 30. The pattern of the meshed material or the material selected for the layer is something which may be determined to fit the specific operating parameters. It should also be noted that the expression "meshed thermal insulating material" is intended to be construed in a broad sense and includes every technique producing a flexible fabric-like layer of thermal insulating material, such as weaving, braiding or otherwise interlacing material.

Preferably, the inner jacket 32 is manufactured to be substantially cylindrical. The fact that the inner jacket 32 is flexible makes it easily to fit on non-linear parts. Yet, the inner jacket 32 may not have necessarily a purely cylindrical shape, especially in the case of a component having a complex geometry.

The heat shield 30 also comprises an outer jacket 34 configured and disposed to be fitted around the inner jacket 32. The outer jacket 34 is used to provide some protection and strength to the inner jacket 32. It also allows maintaining the inner jacket 32 in place. The outer jacket 34 comprises at least one layer of meshed wires 36 intermittently intersected by braze wires 38, as depicted schematically in FIGS. 4a and 5a. The pattern of the meshed material or the material selected for the meshed wires is something which may be determined to fit the specific operating parameters. It should also be noted that the expression "meshed wire" is intended to be construed in a broad sense and includes every technique producing interwoven wires, such as weaving, braiding or otherwise interlacing.

Figure 4B:
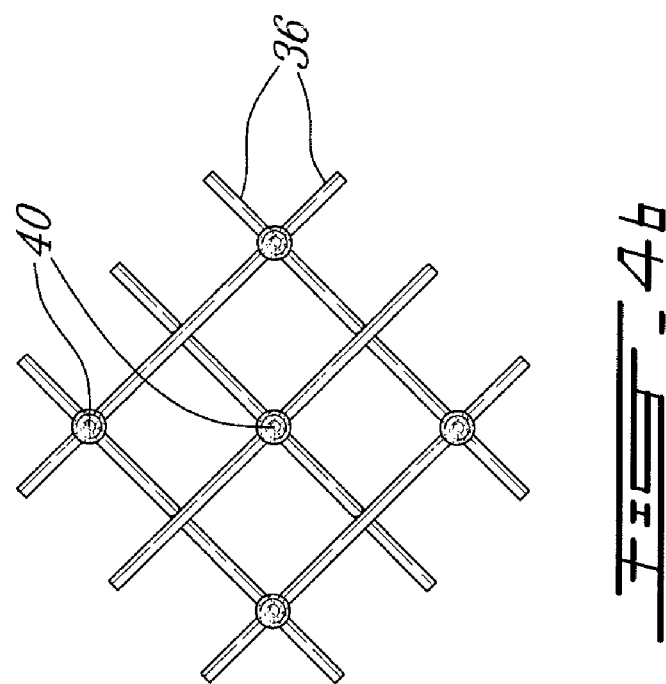
FIG. 4b is a view similar to FIG. 4a, showing the meshed wires with attachment points resulting from a melting of the braze wires.
Figure 4A:
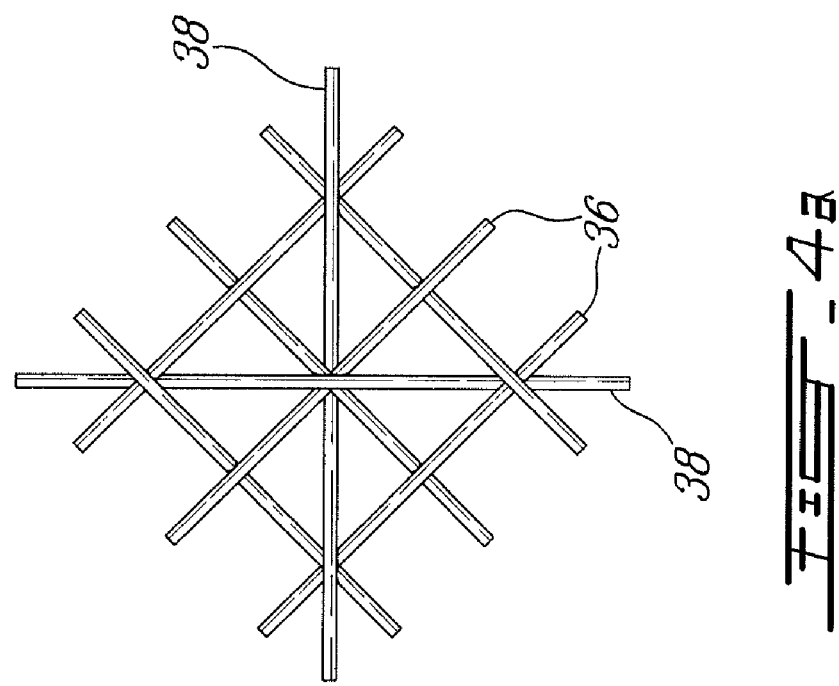
FIG. 4a is a schematic view of meshed wires intersected by braze wires before the braze wires are melted.
Figure 5B:
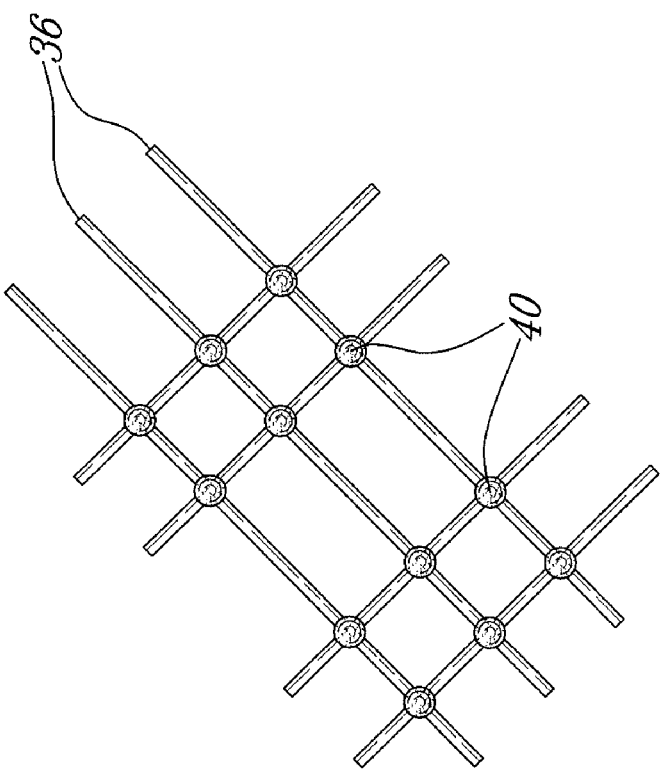
FIG. 5b is a view similar to FIG. 5a, showing the meshed wires with attachment points resulting from a melting of the braze wires.
Figure 5A:
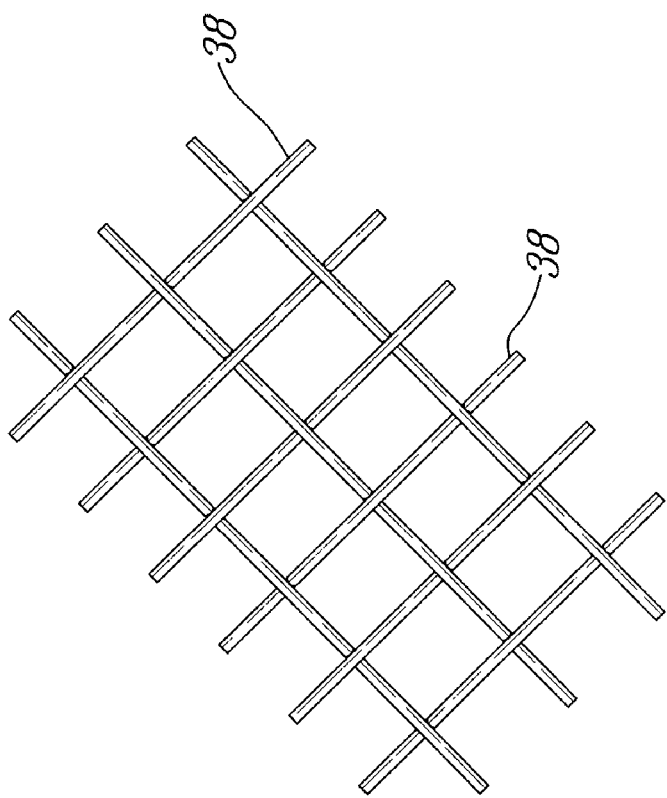
FIG. 5a is a view similar to FIG. 4a, showing braze wires disposed in another fashion.

As shown in FIGS. 4a and 5a, the meshed wires 36 are intermittently intersected by braze wires 38. The braze wires 38 intersect the meshed wires 36 at some points. The outer jacket 34 is designed so that it is substantially flexible when fitted over the component during manufacturing to follow non-linear shapes. However, once the heat shield 30 is in place, the heat shield 30 is preferably heated (e.g. in a high temperature oven or the like) so as to melt the braze wires 38 to from attachment points 40. Hence, once heat is applied and the braze wires reach the melting point, the braze flows by surface tension to produce attachment points 40 where two or more meshed wires intersect. These attachment points 40 are shown in FIGS. 4b and 5b. Once cooled, the attachment point 40 cause the outer jacket to become somewhat "rigidified".

The braze wires 38 preferably have a melting temperature well above the operating temperature at the location where they will be used. For instance, a heat shield designed to operate in an environment of 1000-1200° F., a preferred melting temperature is about 1800° F. The meshed wires 36 are also made of a highly heat resistant material that can withstand the temperature of its operating environment. The material has a melting point higher than that of the braze material.

Various patterns of meshed wires can be selected for the design of the outer jacket 34, as shown in FIGS. 4a and 5a. Similarly, the number and position of the braze wires 38 depend on the actual requirements in terms of rigidity and durability. The density of the attachment points 40 can also vary around the heat shield 30. For instance, the density of the attachment points 40 at the ends of the heat shield 30 is preferably higher that the density at the intermediate portion.

The mechanical connection between the heat shield 30 and a component must be strong enough to resist the operational environment, such as the usual harsh environment encountered in gas turbine engines. Among other things, the heat shield 30 used in a gas turbine engine must be able to withstand intense vibrations. A preferred solution to this problem is to use the outer jacket 34 itself to the ends of the heat shield 30 onto the component. One way of achieving this goal is to maintain the ends of the outer jacket 34 in position until the outer jacket 34 is stiffened by the attachment points 40. Spot welding some of the meshed wires 36 together is the preferred technique used. Alternatively, one can use an external clamping ring (not shown) to urge the ends of the outer jacket 34 of the heat shield 30 onto clamping surfaces of the component during assembly. Using a permanent clamping ring, which will stay on the heat shield 30 after the manufacturing process, is also possible.

The above description is meant to be exemplary only, and one skilled in the art will recognize that changes may be made to the embodiments described without department from the scope of the invention disclosed. For example, heat shielding using the present invention is not limited to fuel nozzles since it can be advantageously used with many other components. Other shapes than cylindrical shapes can be used in the design of the heat shield. Using a flat or otherwise non-tubular heat shield is also possible. The insulation material is not limited to ceramic fibres. Stiffening is not necessary but if desired may be achieved by other ways as well, such as intermittent or spot welds, high temperature epoxies, etc. Securing the outer jacket on the component can be done using an external ring or other techniques which mounted the outer jacket 34 to the ends 24, 26 of the stem 22. A same heat shield may be manufactured using meshed wires made of several different materials and braze wires also made of several different materials. Wires need not to be used at all, as other configurations of strip-like material may be used. Any suitable method of holding the strips together into a cohesive but flexible material or fabric may be employed. Still other modifications which fall within the scope of the present invention will be apparent to those skilled in the art, in light of a review of this disclosure, and such modifications are intended to fall within the appended claims.

The invention claimed is:

1. A heat shield assembly for a stem of a fuel nozzle, the assembly comprising:
    a fuel nozzle having a stem extending along a central axis between a mounting portion and a nozzle tip, the stem having at least one non-linear portion in which the central axis is non-linear;
    a flexible inner jacket disposed around at least the non-linear portion of the stem of the fuel nozzle, the inner jacket comprising at least one layer of meshed thermal insulation material; and
    a flexible outer jacket disposed around the inner jacket, the outer jacket comprising at least one layer of meshed wires.

2. The heat shield assembly as defined in claim 1, wherein the thermal insulation material comprises ceramic fibres.

3. The heat shield assembly as defined in claim 1, wherein the inner and outer jackets are substantially cylindrical.

4. The heat shield assembly as defined in claim 1, wherein the stem is generally cylindrical in cross-section, and wherein the jackets are substantially in contact with an outer periphery of the stem along a length of the at least one non-linear portion.

5. The heat shield assembly as defined in claim 1, wherein the jackets substantially conform to an outer surface shape of the at least one non-linear portion of the stem.

6. The heat shield assembly as defined in claim 1, wherein at least the outer jacket is fixed to the nozzle tip.

7. The heat shield assembly as defined in claim 6, wherein the outer jacket is fixed by one of welding and brazing.

8. The heat shield assembly as defined in claim 1, wherein the outer jacket further comprises braze wires intersecting the wires in the at least one layer of meshed wires, the braze wires having a melting point lower than the meshed wires and thereby adapted to be melted during a braze operation to attach at least the outer jacket to the stem.

9. The heat shield assembly as defined in claim 8, wherein the braze wires are interwoven with the mesh wires in the outer jacket.

10. The heat shield assembly as defined in claim 8, wherein the braze wires are provided in higher densities adjacent opposite ends of the outer jacket.

11. The heat shield assembly as defined in claim 1, wherein the at least one non-linear portion comprises two portions having linear central axes, the two portions joining one another at an obtuse angle.

12. A heat shield assembly for a fuel nozzle component, the heat shield assembly comprising:
   a fuel component having a stem extending between a base and a nozzle tip, the stem having at least one non-linear portion including two linear portions connecting at an obtuse angle;
   a flexible thermal insulation inner jacket covering at least the non-linear portion of the component; and
   an outer jacket covering the inner jacket between two opposite ends of the heat shield, the outer jacket comprising meshed wires wherein at least some junctions between wires of the meshed wires are attached by attachment points made from braze wires interwovenly provided within the outer jacket, the braze wires having a lower melting point than the meshed wires, at least portions of the braze wires having been selectively melted to provide said attachment points.

13. The heat shield assembly as defined in claim 12, wherein at each end of the heat shield, the outer jacket is secured to the component.

14. The heat shield assembly as defined in claim 13, wherein the outer jacket comprises opposite end areas where the attachment points are provided at a higher density than that of an intermediate area between the end areas.

15. The heat shield assembly as defined in claim 12, wherein the stem is generally cylindrical in cross-section, and wherein the jackets are substantially in contact with an outer periphery of the stem along a length of the non-linear portion.

16. The heat shield assembly as defined in claim 12, wherein the jackets substantially conform to an outer surface shape of the non-linear portion of the stem.

* * * * *